US012621127B2

(12) United States Patent
Bennison

(10) Patent No.: US 12,621,127 B2
(45) Date of Patent: May 5, 2026

(54) SYSTEMS AND METHODS FOR HIGH-CONFIDENCE SYMMETRIC-KEY DOCUMENT SIGNING AND ENCRYPTION USING A COMPUTING DEVICE

(71) Applicant: James E. Bennison, Oakton, VA (US)

(72) Inventor: James E. Bennison, Oakton, VA (US)

( * ) Notice: Subject to any disclaimer, the term of this patent is extended or adjusted under 35 U.S.C. 154(b) by 0 days.

(21) Appl. No.: 19/054,256

(22) Filed: Feb. 14, 2025

(65) Prior Publication Data

US 2025/0266987 A1 Aug. 21, 2025

Related U.S. Application Data

(60) Provisional application No. 63/554,357, filed on Feb. 16, 2024.

(51) Int. Cl.
*H04L 29/06* (2006.01)
*H04L 9/08* (2006.01)
(Continued)

(52) U.S. Cl.
CPC .......... *H04L 9/0819* (2013.01); *H04L 9/0894* (2013.01); *H04L 9/3231* (2013.01);
(Continued)

(58) Field of Classification Search
CPC ... H04L 9/0819; H04L 9/0894; H04L 9/3231; H04L 9/3247; H04L 9/3271; H04L 63/0435; H04L 9/32; H04L 9/3213; H04L 63/08; H04L 63/0807; H04L 63/0861; H04L 63/0869; G06F 21/30; G06F 21/31; G06F 21/45; G06F 2221/2103; G06Q 20/3674; G06Q 20/409; G06Q 20/4093; G06Q 20/4097; G06Q 20/206; G07C 2009/00388; G11B 20/00152; G10L 17/24; G08C 2201/61; G05B 2219/24154; G05B 2219/24162; G05B 2219/24167; G05B 2219/36542; H04H 60/23; H04M 2203/6072; H04M 2203/6054; H04N 21/25816; H04N 21/25875;
(Continued)

(56) References Cited

U.S. PATENT DOCUMENTS

2011/0055585 A1* 3/2011 Lee ........................ H04L 9/3226
713/183
2011/0197070 A1* 8/2011 Mizrah ............... H04L 63/0869
713/176

* cited by examiner

*Primary Examiner* — Amir Mehrmanesh
*Assistant Examiner* — Leynna Truvan
(74) *Attorney, Agent, or Firm* — Birch, Stewart, Kolasch & Birch, LLP

(57) ABSTRACT

A method, system, and digital recording medium create one-time-use digital signing and encryption keys with a computing device combining multifactor, typically four authentication factors, through use of a remote authentication system (RAS) to providing cryptographic proof with very-high confidence that a document was signed and/or encrypted by the known user and not someone posing as said user. A device-unique identity token cryptographically bound to the user's computing device is the first factor, a password known only to the user is the second, cryptographic signatures generated from the user's biometrics is the third, and a random challenge generated by the RAS is the fourth. The user's computing device captures the user's input and creates a cryptographic string that is sent to the RAS for authentication.

12 Claims, 3 Drawing Sheets

Digital Signing Process

(51) Int. Cl.
 *H04L 9/32* (2006.01)
 *H04L 9/40* (2022.01)
(52) U.S. Cl.
 CPC .......... *H04L 9/3247* (2013.01); *H04L 9/3271*
 (2013.01); *H04L 63/0435* (2013.01)
(58) Field of Classification Search
 CPC ....... H04N 1/00411; H04N 2201/3236; H04N
 2201/3239; H04N 2201/3233; H04Q
 2213/13515; H04W 12/00; H04W 16/06;
 H04W 12/065
 See application file for complete search history.

Digital Signing Process

Digital Signature Verification Process

Figure 3

Representative Symmetric Encryption-Key Exchange Process

SYSTEMS AND METHODS FOR HIGH-CONFIDENCE SYMMETRIC-KEY DOCUMENT SIGNING AND ENCRYPTION USING A COMPUTING DEVICE

CROSS-REFERENCE TO RELATED APPLICATIONS

This non-provisional application claims the benefit under 35 U.S.C. § 119(e) to U.S. Provisional Application No. 63/554,357, filed on Feb. 16, 2024, all of which is hereby incorporated by reference into the present application. This application is an improvement on application Ser. No. 17/530,136 filed on Nov. 18, 2021 now U.S. Pat. No. 11,405,189 B1 (hereafter referred to as the -189- patent) granted Aug. 2, 2022 entitled "Systems and Methods for Trustworthy Electronic Authentication Using a Computing Device" which is hereby expressly incorporated by reference into the present application.

FIELD OF THE INVENTION

The present application is directed to trustworthy systems and methods for generating symmetric cryptographic-keys to provide high confidence digital signing and encryption of electronic data by utilizing a registered known user's ephemeral, typically four-factor, authentication-response to derive signing-keys and encryption-keys, particularly for use in the e-commerce environment.

BACKGROUND

Digital signatures are used to authenticate the identity of the signatory and to detect unauthorized modifications to data. A digital signature, also known as an electronic signature, is a cryptographic method for verifying the authenticity and integrity of digital messages or documents. A valid digital signature gives a relying party a level of confidence that the message was created by a verified known sender (authenticity), and that the message was not altered in transit (integrity). In addition, the recipient of signed data can use a digital signature as evidence in demonstrating to a third party that the signature was, in fact, generated by the claimed signatory. This attribute is known as 'non-repudiation' since the signatory cannot easily refute, at a later time, that the message was signed by them.

An example of current digital signature technologies is the Federal Information Processing Standard (FIPS) 186-5 Digital Signature Standard (DSS). This DSS relies on public key cryptography which uses asymmetric signing keys in public-private key pairs to encrypt and decrypt messages and their associated Message Authentication Code (MAC), which is a typical method used to cryptographically create a digital signature. However, the long-term viability of current asymmetric-key cryptosystems is at increased risk of compromise when quantum computing becomes available at some time in the future. Such quantum computing may make it practical to perform factorization of large integers, rendering such asymmetric-key encryption and digital signature systems vulnerable and accordingly potentially obsolete for their typical intended uses. It should be noted that asymmetric cryptosystems for signing and encryption of documents are more at-risk than communications-based encryption systems because the effective lifetime (potentially unlimited) of a digitally signed document is not necessarily limited in time like the typical lifetime of encrypted communications such as e-commerce transactions.

In contrast, symmetric-key encryption schemes including systems using long-term shared-secret encryption-keys of sufficient key lengths are not considered to be vulnerable to known quantum computing attacks and are therefore considered by cryptography experts at the US Government's cryptography authorities, the National Institute of Standards and Technology (NIST) and the National Security Agency (NSA), to be the best long-term solution.

What is needed is a new method using symmetric-key signing and encryption that improves on the confidence level of verifying the identity of the signatory, is not vulnerable to quantum cryptanalysis attacks, and overcomes the challenges of symmetric-key management such that it can be scaled to support possibly billions of computing devices and users.

OBJECTIVES AND BENEFITS

The embodiments described herein when used in the light of the teachings of the -189-patent overcome some or all of the disadvantages of asymmetric cryptography signature schemes described above in the BACKGROUND section of the present application. In the context of the present application and the -189- patent, the terms "user", "known user" and "signatory" all refer to the same entity. The embodiments of the present application exhibit some or all of the following advantages achieved in accordance with the teachings of the present application:

An advantage of the embodiments disclosed herein is that they may improve the level of confidence in digital signatures derived from the strength of the signatory's authentication that results from utilizing an increased number of authentication factors over the prior art, identity factors which are combined cryptographically to bind the known user to their device, their password and their biometric identity and furthermore adding a dynamic one-time random challenge factor to create a non-repeating ephemeral key that thwarts replay attacks by electronic eavesdroppers.

An advantage of the disclosed embodiments is that they may be used to prove the identity of the known user with "very high confidence" conforming to Identity Assurance Level 3 (IAL-3) as described in NIST Special Publication (SP) 800-63B "Digital Identity Guidelines—Authentication & Lifecycle Management" (2017).

An advantage of the disclosed embodiments is that the four user identity factors which may be used, particularly the dynamic biometric factor, to inherently provide elevated confidence, as compared to the prior art, that the known user is a human rather than a non-human entity (e.g., deep-fake A.I., bot) posing as the user.

An advantage of the disclosed embodiments is that they may provide a higher strength of non-repudiation than current digital signature methods due to the stronger "proof of possession of presented [signing] key verifies [known user]'s participation" which is provided by the four-factors of user authentication that generate the digital signing-keys as described in the NIST SP 800-63C "Digital Identity Guidelines: Federation & Assertions" (2017).

An advantage of the disclosed embodiments is that they may provide quantum-immune symmetric-key encryption and signing as the long-term cryptographic method when combined with quantum-resistant or quantum-safe cryptographic algorithms in order to be "quantum-ready" as recommended by NIST, NSA and other cryptographic standard-setting organizations. It should be noted that symmetric-key cryptography with key lengths of 512 bits or more are considered by cryptographers to be quantum-immune for the foreseeable future.

An advantage of the disclosed embodiments is that each signing-key may be used only one time, thereby avoiding a limitation of conventional signature keys as stated in NIST SP 800-38B "Recommendation for Block Cipher Modes of Operation—The CMAC Mode for Authentication" (2005) that, for any system in which Cipher-based Message Authentication Code (CMAC) is implemented, there is a risk that an attacker can detect and exploit a collision. The disclosed embodiment inherently complies with the recommended method to enforce the smallest possible limit on the message span of any CMAC key by using each signing-key only once, which in turn mathematically eliminates the possibility that a collision can occur.

An advantage of the disclosed embodiments is that they may provide a known user authentication method for digitally signing and encrypting documents electronically that does not depend on the quantum vulnerable Public Key Infrastructure (PKI) asymmetric-key management system.

An advantage of the disclosed embodiments is that they may use a trusted middle-man escrow agent for registering, and identity-proofing of known users and their identity factors does not require new or additional registration and identity proofing of known users for each relying party which typical prior art digital signature schemes require.

An advantage of the disclosed embodiments is that generating a digital signing-key that requires a device identity, a one-time-use challenge, the signatory's password and biometric digital signatures to generate a unique and ephemeral digital signature for every document signed by the known user may significantly increase the work-effort for a fraudster to counterfeit digital signatures.

An advantage of the disclosed embodiments is that, by archiving a known user's deprecated digital signatures every time they change their password and/or biometric digital signatures, they may provide for an expired key escrow service that may enable retroactive decryption of data previously encrypted utilizing the known user's expired digital signatures, and verification of digital signatures for documents originated by the known user for the lifetime of the document since it may be used to verify the signature at any arbitrary point in the future.

An advantage of the disclosed embodiments is utilizing the known user's, typically four-factor, authentication-response as the encryption-key for communications confidentiality inherently may provide cryptographic attribution back to the known user, thereby effectively signing every message encrypted with it which thereby making separate signing and encryption-keys unnecessary.

An advantage of the disclosed embodiments is that, by generating a unique, one-time-use encryption-key from the known user's authentication-response for each encrypted session, they may provide information-theoretical perfect secrecy by using "One-Time-Pad like" key structures which provides symmetric encryption-keys which are considered by cryptography authorities to be immune to quantum cryptanalysis methods and brute force attack.

An advantage of the disclosed embodiments is that they may overcome the challenge of symmetric-key management at-scale by providing a method for securely exchanging shared-secret key-derivation keys and biometric digital signatures that can be used to generate symmetrical signing and encryption keys.

4

BRIEF DESCRIPTION OF THE DRAWINGS

The details of the disclosed invention, both as to its structure and operation, can best be understood in reference to the accompanying drawings in which:

FIG. 3 is a system diagram showing a REPRESENTATIVE SYMMETRIC ENCRYPTION-KEY EXCHANGE PROCESS for a symmetric-key encrypted session for confidential communications between a plurality of known users, established by utilizing each user's authentication-response and performing cryptographic operations on it to generate each user's segment of the session encryption-key, then brokering the key exchange through the remote authentication system to obtain the remaining segment(s) of the encryption-key for each user in order to create a shared-secret symmetric session encryption-key.

DETAILED DESCRIPTION OF DRAWINGS FOR THE DISCLOSED EMBODIMENTS

According to the teachings of the present application, an improved post-quantum symmetrical digital signature and encryption scheme is created as is explained below. The present application describes systems, methods and computer readable media implementing typically four-factor user authentication as a means of creating symmetric keys for digitally signing documents. Note that the scope of the present patent is defined by the claims appended hereto.

Figure 1:
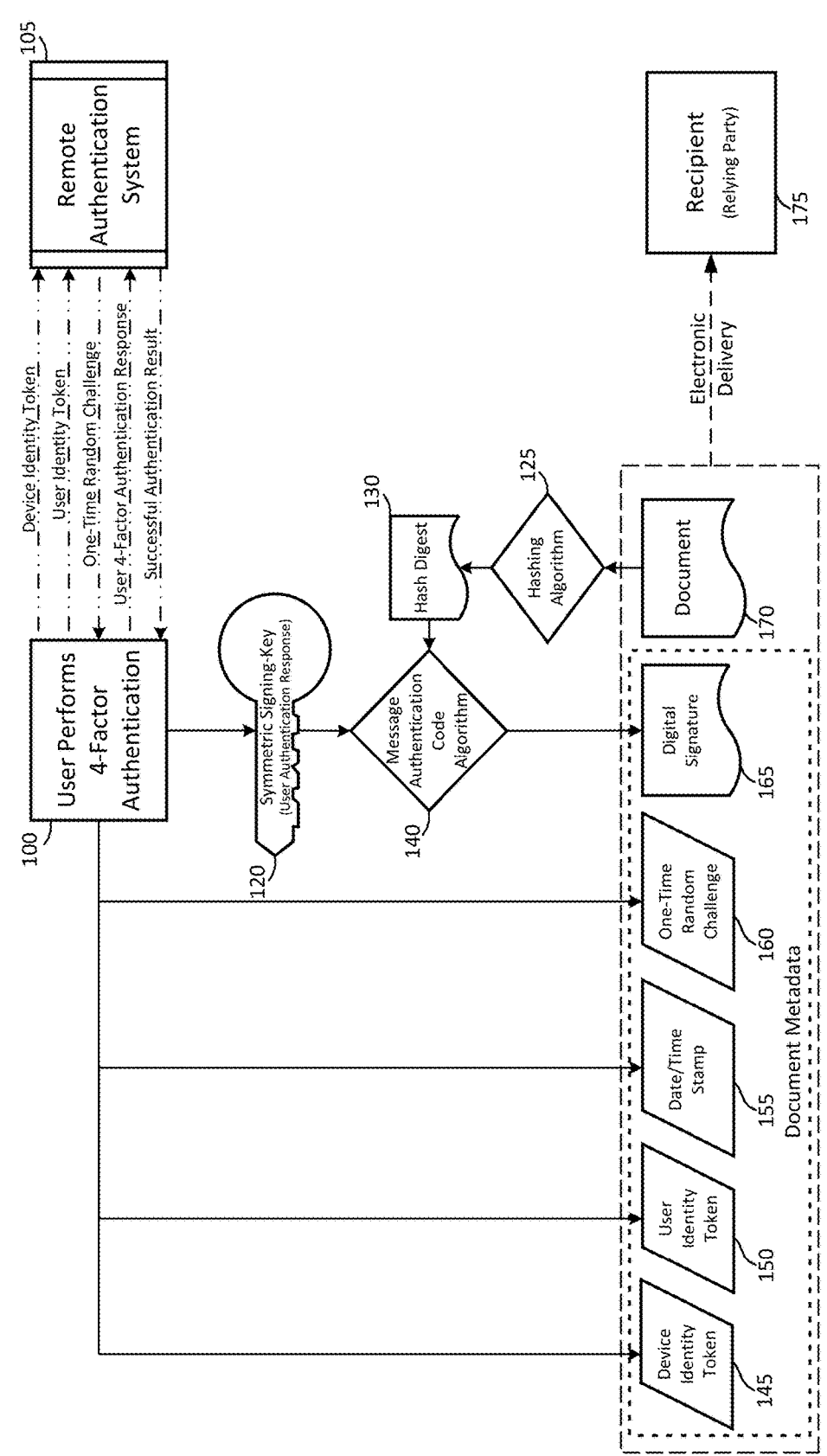
FIG. 1 is a system diagram disclosing a DIGITAL SIGNING PROCESS of a known user authenticating to a remote authentication system and generating a one-time authentication-response, then using that response to derive the cryptographic signing-key for a document.

Referring to FIG. 1, a known user performs authentication 100, e.g., four-factor authentication, with a remote authentication system 105 as described in further detail in the -189-patent, FIGS. 4a-4d steps 425 through 490. The document to be signed is cryptographically transformed using an algorithm 125, which in one preferred embodiment is a Secure Hash Algorithm (SHA) as recommended by the NIST Federal Information Processing Standard (FIPS) PUB 180-4 "Secure Hash Standard" (2015), to create a hash digest 130 of the document 170. The known user's authentication-response as generated in 105 is used as the one-time symmetric signing-key 120 for encrypting, using a message authentication code algorithm 140, the hash digest 130 of the document 170 to be signed using a symmetric-key encryption algorithm, such as the block Cipher-based Message Authentication Code (CMAC) as described in NIST SP 800-38B "Recommendation for Block Cipher Modes of Operation—The CMAC Mode for Authentication" (2005), in order to create a digital signature 165 for the document 170 such as what is described in NIST FIPS PUB 186-5 "Digital Signature Standard (DSS)" (2023). Then the document 170 along with the digital-signature metadata is electronically delivered to the recipient. This digital-signature metadata may preferably include elements further described in the -189- patent. Particularly, the digital-signature metadata delivered with the document 170 may preferably include the device-unique identity token 145 (e.g., as described in FIG. 1 step 165-1 in the -189- patent and corresponding written description), the known user's unique identity token 150 (e.g., as described in FIG. 1 step 140-1 in the -189- patent and corresponding written description), which by way of example could be constructed by using a non-reversible one-way hash (e.g., SHA-2) of the user's Social Security Number (SSN) or equivalent, the date/time stamp 155 indicating when the document was signed, the one-time numeric random challenge 160 (e.g., as described in FIGS. 4a-4d step 425 in the -189- patent and corresponding written description), for example of arbitrary length by using a commercially available hardware high-rate, high-availability, full entropy random number generator, and the digital signature 165.

As mentioned above, the document metadata may include an immutable device-unique identity token 145, which may be generated described in the -189- patent (see FIG. 1 step 165-1 and corresponding written description). For instance, the device-unique identity token 145 may be generated by an app as part of the installation process of the app on a computing device, which is preferably equipped with an unclonable device-unique hardware identifier, and, if not, by utilizing software cryptographic methods/technologies that create an immutable quasi-physically unclonable digital ID by operating on physically identifying properties of the computing device, or optionally if the computing device is a mobile phone then by using identifiers such as the International Mobile Equipment Identifier (IMEI), the Mobile Equipment Identifier (MEID) or equivalent, optionally combined with the user's mobile phone number, or by using any software, hardware or other equivalent method known to those skilled in the art or invented or adapted in the future. Examples of such technologies include Confidentio™ by Intrinsic-ID, Inc. (described in U.S. Pat. No. 8,694,856 B2), which uses manufacturing differences in SRAM memory chips to create an unclonable unique device identity (device-ID) token, or by Sandia Labs (described in U.S. provisional patent application 62/175,753) and called Quasi-Physically Unclonable Digital ID (Q-PUDID).

Figure 2:
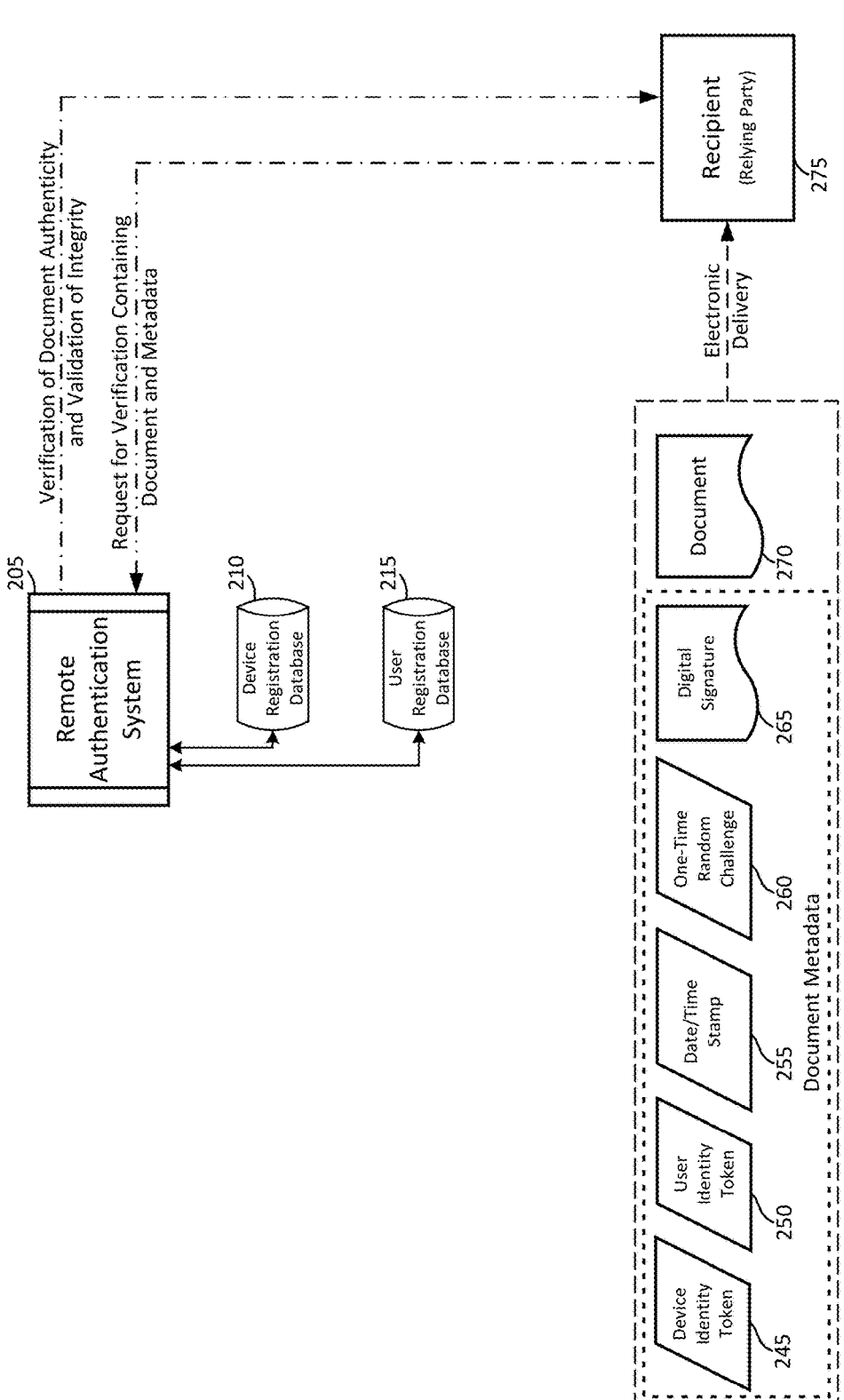
FIG. 2 is a system diagram disclosing a DIGITAL SIGNATURE VERIFICATION PROCESS of a recipient of a signed document submitting the document and its digital-signature metadata to a remote authentication system which reproduces the one-time authentication-response for the known user who is the signatory of the document, and then provides the recipient (relying party) verification of the document's signature authenticity and validation of the document's integrity.

Referring to FIG. 2, in this embodiment, a recipient 275, who is the relying party, may optionally (at present or any time in the future) submit a request to the remote authentication system 205, which acts as the trusted escrow agent, for verification and validation of the signed document 270 along with its digital-signature metadata consisting of the device-unique identity token 245, the known user's unique identity token 250, the date/time stamp 255, the one-time random challenge 260 and the digital signature 265. Then, the remote authentication system 205, as a verifier, may utilize the unique device identity token 245 to look up the user's computing device in the device registration database 210, and utilize the user identity token 250 to look up the known user in the user registration database 215 and retrieve the user's digital-signatures that were in use at the time when the document was signed as determined by the date/time stamp 255. Then, the remote authentication system 205, using the one-time random challenge 260, may independently reproduce the known user's authentication-response (e.g., as described in the -189- patent at FIG. 5 step 546 and corresponding written description), and then reproduce the document hash digest of the document (e.g., as described in the -189- patent at FIG. 1 step 130 and corresponding written description), before using the reproduced known user's authentication-response as the one-time symmetrical signing-key (e.g., as described in the -189- patent at FIG. 1 step 120 and corresponding written description) to encrypt the reproduced hash digest in order to reproduce the digital signature (e.g., as described in the -189- patent at FIG. 1 step 165 and corresponding written description). Then, the remote authentication system 205 may compare the reproduced digital signature to the digital signature 265 received from the recipient (relying party) 275, confirm that the digital signatures match to verify the authenticity of the document's digital signature and validate the integrity of the document 270, and then send those verification and validation results back to the recipient 275.

In another embodiment, the disclosed method may be used for digital code signing by an authorized known user for the purpose of verifying the authenticity of the publisher of software, encryption certificates and other types of digital media.

In another embodiment, the disclosed method may be used for digital code signing by a plurality of authorized known users for the purpose of providing Extended Validation (EV) code signing to verify the authenticity of the publisher of software, high-value financial transactions, server encryption certificates and other digital media that require a higher level of assurance than a signature by a single user can provide.

In another embodiment, the disclosed method may be used for signing a document such as the known user's election ballot so it can be submitted electronically for voting, whereby the known user's digital signature and verified identity can be validated with the remote authentication system by the election authority to ratify the authenticity, integrity, and the eligibility of the known user to cast the ballot as determined by a user identity proofing process, e.g., as defined in the -189- patent at FIG. 1 step 135 and corresponding written description.

In another embodiment, the disclosed method may be used for signing documents such as contracts between parties or other records as defined in 2013 US Code Title 15-Commerce and Trade Chapter 96-Electronic Signatures in Global and National Commerce (§§ 7001-7031).

In another embodiment, the disclosed method may be used for signing digital media such as video/audio recordings, copyrighted written or art works, patents, trademarks, Non-Fungible Tokens (NFTs), etc., whereby cryptographic proof of creation or ownership by a known human-being can be provided.

In another embodiment, the disclosed method may be used for repudiating digital signatures for digital media such as video/audio recordings, copyrighted written or art works, patents, trademarks, Non-Fungible Tokens (NFTs), etc., whereby cryptographic evidence that the media was NOT signed by a known user (e.g., a human-being) can be provided to a relying party.

In another embodiment, the disclosed method may be implemented such that if a known user changes their password and/or registers new biometric digital signatures with the remote authentication system, it will archive all previous versions of the known user's biometric digital signatures along with the date/time-period they were valid from/through in a known user registration database (e.g., as described in the -189- patent at FIG. 2a steps 285 through 295 and corresponding written description) so that key escrow services can be provided at any time in the future to verify and validate previously signed and/or encrypted documents. It should be noted that, in prior art using public key cryptography, separate keys are recommended for document signing (e.g., as described in FIG. 1) and data encryption (e.g., as described in FIG. 3) because, if a key is revoked or expired, then a key escrow process may be needed to decrypt documents in order to allow continued access to documents encrypted with a previous key. However, although the present invention may optionally be implemented with separate encryption and signing-keys, the one-time-use random challenge factor of the authentication method disclosed in the -189- patent results in a one-time-use ephemeral encryption-key, whereby a key escrow service is inherently provided even if the same key is used for encryption, since the encryption-key reproduction method disclosed in the present application permits retroactive verification of the digital signature as described in FIG. 2 at any time in the future as long as the digital-signature metadata including the device-unique identity token 145, the known user's unique identity token 150, the date/time stamp 155 showing when the document 170 was signed, the one-time random challenge 160 and the digital signature 165 are preserved and provided to the verifier (i.e., the remote authentication system) along with the signed document 170.

Figure 3:
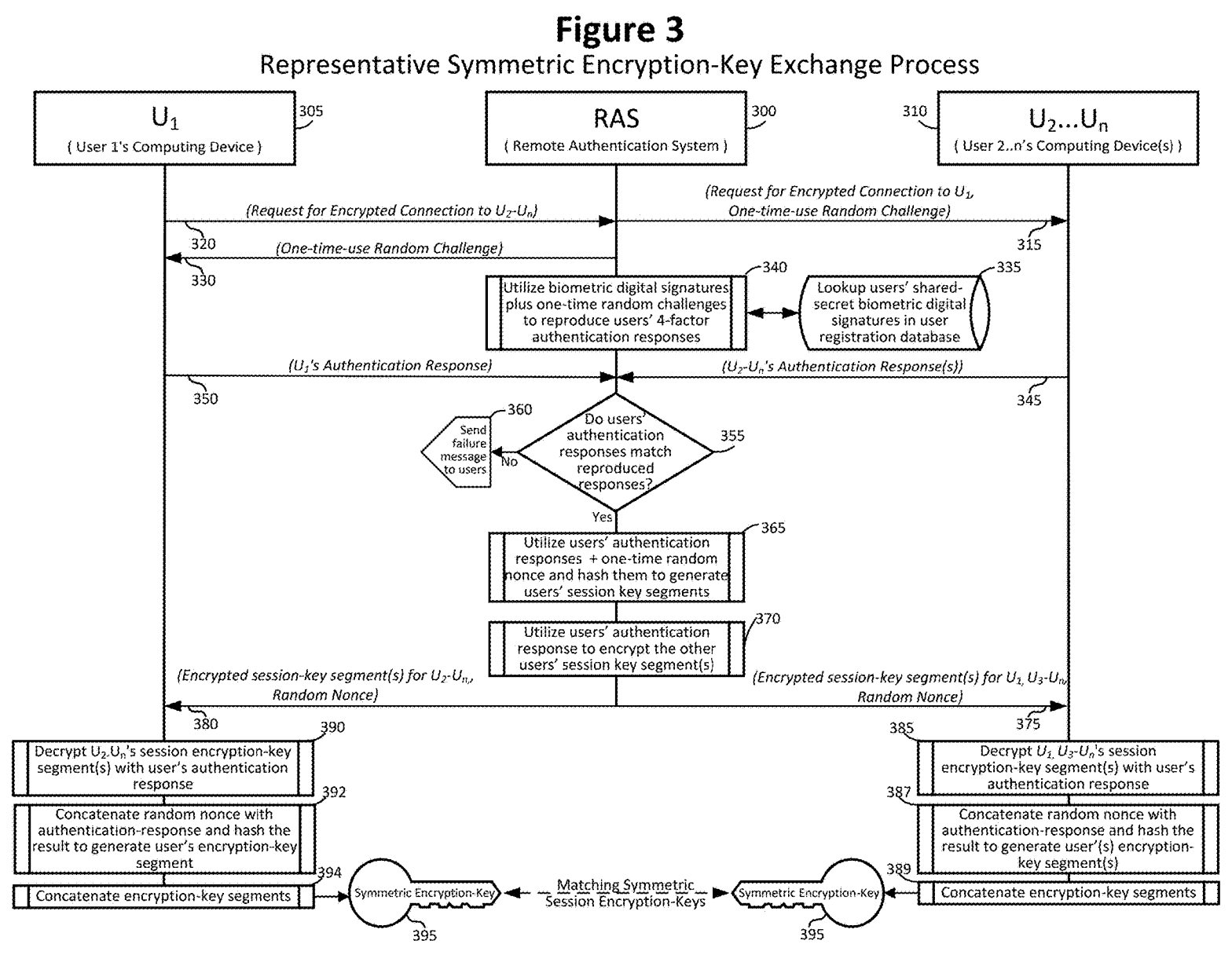

Referring to FIG. 3, in this embodiment, a symmetric-key encrypted session for confidential communications between a plurality of known users is accomplished by concatenating each of their authentication-responses concatenated with respective random nonces, and performing cryptographic operations on the results thereof, to generate each user's segment of a session encryption-key. Then, according to this embodiment, a key exchange is brokered through the remote authentication system to transmit the remaining portion(s) of the session key for the other known user(s) to each user encrypted using their authentication-response as a private key.

According to the embodiment of FIG. 3, a known user $U_1$ 305 requests 320 from the remote authentication system 300 an encrypted session with other known user(s) $U_2$ thru $U_n$ 310. The remote authentication system (RAS) responds with a dynamic numeric one-time random challenge 330 (e.g., as described in the -189- patent at FIG. 4a step 425 and corresponding written description), and transmits a request 315 for encrypted connection(s) to known users $U_2$ thru $U_n$ along with dynamic numeric one-time random challenge(s). The known users will perform authentication using the dynamic numeric one-time random challenge (e.g., as described in the -189- patent at FIGS. 4a-4d steps 425 through 490 and corresponding written description) and transmit the resulting four-factor authentication-responses 345 and 350 to the remote authentication system. The remote authentication system 300 then looks up said users' digital signatures in its user registration database 335 and, using the dynamic numeric one-time random challenges 315 and 330, reproduces 340 the authentication-responses 345 and 350 (e.g., as described in the -189- patent at FIG. 5 step 546 and corresponding written description) and compares 355 the reproduced authentication-response to the authentication-responses received from known users in 345 and 350 to verify that successful user authentications have occurred. If either or both user authentications fail, the remote authentication system 300 may optionally transmit a failure message 360 to the affected user(s). By way of example, this embodiment may broker the key exchange by concatenating the random nonce of arbitrary length with each user's authentication-response received in steps 345 and 350, and then performing cryptographic operations such as utilizing a security hashing algorithm like SHA-2 to create each users' segment of a symmetrical session encryption key 365. The remote authentication system 300 then encrypts the other user(s) session key segment(s) with each user's own authentication-response 370 employed as a private encryption-key, whereby only that user can decrypt the other users' segment(s). Then the remote authentication system transmits to each user 375 and 380 the other user'(s) encrypted encryption-key segment(s) along with the random nonce of arbitrary length concatenated with their own authentication-response then performing cryptographic operations such as described in step 365 to generate their own encryption-key segment. Each user then decrypts 385 and 390 the other user's or users' session key segment(s) with their own authentication-responses 345 and 350. Then, each user concatenates 387 and 392 the random nonce transmitted in 375 and 380 from the remote authentication system 300 with their own authentication response 345 and 350 (e.g., as described in the -189-patent at FIG. 4a step 475 and corresponding written description) for example by concatenating the user's shared-secret biometric digital-signatures (e.g., as described in the -189- patent at FIG. 2a steps 280 thru 295 and corresponding written description), for example by using cryptographic methods such as using a one-way hash algorithm such as SHA2-384 and truncating to a length such as 8 bytes (64 bits) to transform the user ID-token combined with the biometric minutiae data to create a unique "biometric digital-signature" for each character in the user's secret password and then transmitting them securely to the remote authentication system, in the order corresponding to each of the digits in the one-time challenge-passcode's original order, then concatenates the resulting string of digital signatures with the device-ID token and optionally the user-ID token, and performs cryptographic operations on the result to generate 387 and 392 their own session encryption-key segment. Each user then concatenates 389 and 394 all the other known user'(s) encryption-key segment(s) with their own encryption-key segment to assemble the matching shared-secret symmetrical session encryption-keys 395, and then optionally hashes the result with an algorithm such as SHA-2 whereby quantum-immune encryption with perfect forward secrecy and strong encryption and authentication strength using ephemeral keys is provided.

The disclosed embodiment for key-establishment between a plurality of known users is simply representative of the disclosed method, and is intended to be illustrative rather than limiting, and the disclosed method may be accomplished utilizing any of various means such as the Internet Protocol Security (IPSec) key-exchange protocols including methods such as the Oakley Protocol, described in Request for Comments (RFC) 2412: "The OAKLEY Key Determination Protocol" (1998) published by the Internet Engineering Task Force, or SKEME, a symmetric key exchange mechanism based on the Diffie-Hellman Internet Key Exchange (IKE) algorithm as described in "SKEME: A Versatile Secure Key Exchange Mechanism for Internet" (1996) by Hugo Krawczyk published in the IEEE Proceedings of the Symposium on Network and Distributed System Security.

The disclosed embodiment could be used by apps such as Signal, Telegram, WhatsApp, Wickr, etc. to provide strong end-to-end encryption for confidential communications where the shared-secret symmetric encryption key can only be known to the parties communicating, and cannot be intercepted by an eavesdropper during the key exchange. This is because each known user's segment of the shared-secret encryption-key (as described above in connection with the key-exchange method of FIG. 3) may remain solely in the possession of each known user and never be transmitted over the network connected to the user's computing device. This ephemeral key exchange mechanism also complies with TLS 1.3 requirements as described in RFC 8446

Transport Layer Security (TLS) Protocol Version 1.3" (2018). It should be noted that courts have ruled that the $5^{th}$ Amendment to the US Constitution also protects users from being required by the government to reveal their passwords, which may include passwords that are used to derive encryption keys that are protecting information that may incriminate them; this embodiment may protect users from revealing their four-factor authentication-response since one of the four factors is the user's password.

This disclosed embodiment may benefit by implementation following a key-establishment scheme such as recommended in NIST 800-56a "Recommendations for Pair-Wise Key-Establishment Schemes Using Discrete Logarithm Cryptography" (2018). The Diffie-Hellman method described therein is one such anonymous (non-authenticated) key-agreement protocol, i.e., people involved in the exchange do not need to prove who they are. The presently disclosed embodiment describes an authenticated protocol using the strong four-factor user authentication method described in the -189- patent. In key-establishment cryptography, there are three possible combinations of static and ephemeral key-pairs that have strength attributes as summarized in Table 1 below:

TABLE 1

| Key-Pairs and their Strength Attributes | | | |
| --- | --- | --- | --- |
| Key 1 | Key 2 | Encryption Strength | Authentication Strength |
| Ephemeral | Ephemeral | Strong | Weak |
| Ephemeral | Static | Medium | Medium |
| Static | Static | Weak | Strong |

By deriving the encryption key according to the presently disclosed embodiment, where provided that the encryption key is derived using the disclosed embodiment where the ephemeral key is cryptographically derived using the users' four-factor authentication-responses, which grants strong authentication to the resulting ephemeral key-pairs, the "Authentication Strength" attribute in the top row of Table 1 for ephemeral key-pairs is elevated to "Strong".

Above embodiments mention four-factor authentication. An example of such four-factor authentication, and four-factor authentication-response, is described in the -189- patent (see FIG. 4a through 4d steps 415 through 490 and corresponding written description). Such four-factor authentication, or other types of multi-factor authentication, may utilize factors comprising: Factor 1; "something you have," e.g., a registered computing device (as described in the -189- patent in FIG. 1 and corresponding written description), plus Factor 2; "something you are," e.g., a behavioral or dynamic biometric such as handwriting gesture recognition or multiple fingerprints (as described in the -189- patent in connection with FIGS. 2a and 2b and corresponding written description); plus Factor 3; "something you know," e.g., one or more secret passwords (as described in the -189- patent in connection with FIGS. 2a and 2b and corresponding written description); combined with a dynamic Factor 4, e.g., a high-entropy (i.e., unpredictable) one-time challenge consisting of a random sequence of digits that does not have to be repeated until the authentication keys are changed, received from a remote authentication system in order to authenticate to a challenge-passcode generated by the secure-pay app as described herein. By way of example, the user has previously chosen at the time of user biometric registration (as described in the -189- patent in connection with FIGS. 2a and 2b and the corresponding written description) at least one secret password of arbitrary length.

As described above, one of the factors that can be used in multi-factor authentication includes "something you are," e.g., a behavioral or dynamic biometric such as handwriting gesture recognition or multiple fingerprints. The -189- patent (see FIG. 2a and corresponding written description) of a high-assurance user biometrics registration process to utilize the user's registered computing device (as described in the -189- patent in FIG. 1 and corresponding written description) equipped with biometric sensor(s) (e.g., motion sensor, fingerprint reader, touch-screen) for securely capturing the user's biometric identifiers using, e.g., an installed app and registering them with the remote authentication system. The registered user (as described in the -189- patent in FIG. 1 step 135) is prompted by the computing device to register each character of a secret authentication password of arbitrary length one at a time by using the computing device's biometric sensors using either Method 1 or Method 2 as described below (the user may further be prompted by the installed app to enter a secret duress password that can be employed by the user in the event they are being forced to authorize a transaction against their will). It should be noted that each character of the password may beneficially be entered multiple times in order to train the app to recognize the user's biometrics with high enough fidelity to prevent false positives and false negatives in use. The secret password can be any combination of characters in any language, or even Mooney images, pictograms, or graphic figures that are supported by the computing device, but in the simplest example it can be a 5 to 9 letter word that is easy to remember.

It should be noted that the security strength of such a multi-factor authentication system and method does not depend on the user remembering long and complex passwords, which were designed to resist brute-force dictionary attacks as in older single-factor authentication systems, because the disclosed method generates a binary passcode of much higher complexity than even the most complex human readable passwords by using cryptographic methods on the users' biometric digital-signatures derived from the simple secret password, nor does it require the secret password itself to be transmitted between the user and the remote authentication system, thereby eliminating the vulnerability of interception and decoding of the secret password by a man-in-the-middle attack during transmission. It should also be noted that use of such multiple technical factors to provide high-strength authentication may be advantageous in reducing or eliminating the need for the user to memorize long complex passwords and/or multiple passwords for every system they need to authenticate to, and minimizes changing passwords on a periodic basis.

The secret password selected can be any word or string of characters of arbitrary length that the user can easily remember. In one example, five characters are used corresponding to the five fingerprints in Method 2 demonstrating one character assigned to each finger, however at least five characters are recommended in order to prevent an in-person observer from capturing the entire secret password during a four-character authentication sequence.

For security reasons, it is recommended that the user not use passwords such as their name or family members' names, the street they live on, their birthday, anniversary, or anything associated with them that can be discovered from publicly available sources (e.g., social media). Then the registered user 260 is prompted by the secure-pay app 210 to enter the secret password characters as described in one of the following two exemplary methods by utilizing the computing device's sensor hardware:

Method 1: This method implements dynamic biometric handwriting gesture recognition technology as disclosed in U.S. Pat. No. 10,367,805, which is incorporated herein by reference, and utilizes the motion-sensing hardware present in most mobile computing devices (e.g., accelerometer, g-meter, gyroscope, geomagnetic sensor) to sense the unique shape of characters as well as the sequence, speed and acceleration of strokes as the user employs the device like a wand to draw the characters in the air, or depending on the sensitivity of the device's motion-sensing hardware, they could hold the corner of the device and use it like a pen as if they were writing on a flat surface, or alternatively the user could draw the characters on a trusted touchscreen affixed to the computing device. The user enters each character of the secret authentication and duress passwords one character at a time when prompted by the app, which then captures the biometric handwriting minutiae as it is entered by the user.

Method 2: This method uses fingerprint sensor hardware available on some computing devices for the user to register their fingerprints by pressing or swiping their fingers on the fingerprint sensor which then captures the fingerprint biometric minutiae (e.g., conformant with recognized standards such as the International Committee for Information Technology Standards (INCITS 378-2004) MINUSTD minutiae template standard). The user assigns one character of the secret password to each finger and enters each character in the authentication password one character at a time when prompted by the app which captures the corresponding biometric fingerprint minutiae. Note that, in the case of using fingerprints as the biometric method, the user's secret password may be agnostic to the fingers the user assigns the secret passwords to (e.g., right hand or left hand or both, left-to-right or right-to-left order). This human randomness factor would further increase the work effort for an eavesdropping adversary to capture and decode the secret password, and also makes the method more flexible for use by partially handicapped persons with injured or missing hands or fingers.

Once the secret password and corresponding biometric minutiae are captured, the app may save the biometric minutiae to the computing device's credential storage (as described in the -189- patent in FIG. 1 step 170 and corresponding description), then the app uses cryptographic methods to transform the biometric minutiae data and create a unique "biometric digital-signature," also referred to as a derived "electronic signature," for each character in the secret password. The app then creates 2-tuples containing a number representing the secret password character's offset position within the password string paired with the corresponding biometric digital-signature for that character.

Various methods and algorithms could be used to create the biometric digital-signatures, but by way of example the biometric template minutiae data could be concatenated with a unique user-ID token (as described in the -189- patent in FIG. 1 step 140-1 and corresponding description) which would create a cryptographic binding between the biometric minutiae for the secret password character and the user, then this string could be hashed using a one-way hash algorithm such as SHA2-384 and truncated to a length such as 8 bytes (64 bits). This truncation serves two purposes: one, it minimizes the amount of data that needs to be encrypted and transmitted to the remote authentication system during future electronic authentication transactions as well as during the registration process; and two, it ensures that even if captured by a fraudster the partial (e.g., truncated) hash digest of the biometric digital-signature would be mathematically impossible to perform cryptanalysis and reveal the personally identifiable information (e.g., the complete biometric template minutiae) of the registered user. It should be noted that the truncated biometric digital-signature has a finite probability of creating a hash collision between two letters of a user's password, however, when combined with the unique user-ID it would have a vanishingly small probability of creating a hash collision between digital-signatures of two different users, and even if a collision does occur, the user could simply select another character or secret password that does not include the characters that collide. Another advantage of this method is that unlike static physical biometric data, in the event the derived biometric digital-signatures are captured by a fraudster or otherwise compromised they can be changed easily by the user by simply selecting a new secret password and repeating the registration process with the remote authentication system.

Once the biometric digital-signature 2-tuples are created, they will be saved, preferably in the computing device's credential storage. In a further embodiment, the user's biometric handwriting minutiae and/or the biometric digital signature 2-tuples could be stored on a smart card with the app.

The embodiments disclosed herein provide stronger non-repudiation properties than current methods due to the increased strength afforded by four-factor user authentication compared to prior art. Specifically, although the known user can share their password factor and the one-time challenge factor can be reproduced with enough guesses, but the known user's biometric identification factor and the device-unique identity token factor, such as immutable device-unique hardware identifiers which are asserted to be unclonable that can support device-level hardware-enforced root-of-trust authentication and encryption methods (e.g., as further described in the -189- patent), that require very high work-effort to counterfeit, thereby making it significantly more difficult for a fraudster to pose as the known user and also harder for the known user to repudiate the cryptographic evidence the digital signature provides that the document is genuine and was signed by the known user.

Glossary

The terms, systems and methods described in this disclosure include the following terms and their exemplary, non-limiting definitions:

ASYMMETRIC DATA ENCRYPTION-KEY: Keys used with asymmetric-key algorithms to apply confidentiality protection to information and communication sessions.

ASYMMETRIC SIGNING-KEY: Used with asymmetric-key algorithms to provide assurance of the integrity and source of messages, communication sessions, or stored data.

CHALLENGE-RESPONSE PROTOCOL: As defined in NIST Special Publication 800-63-3 "Digital Identity Guidelines" an authentication protocol where the remote authentication system (e.g., verifier) sends the user (e.g., signatory) a challenge (usually a random value) that the user combines with a shared-secret to generate a response (such as by computing the hash of the challenge and the shared secret) that is sent back to the verifier whereby they can independently verify the response generated by the claimant (such as by re-computing the hash of the challenge and the shared secret and comparing to the response) and establish that the claimant possesses and controls the secret.

CMAC: Cipher-block Message Authentication Code (CMAC) is a type of message authentication code (MAC) algorithm that is based on a symmetric-key block cipher.

DOCUMENT: Per 2013 US Code Title 15—Commerce and Trade Chapter 96—Electronic Signatures in Global and National Commerce (2013) (§§ 7001-7031) a "document" is defined as a "record" which is "information that is inscribed on a tangible medium or that is stored in an electronic or other medium and is retrievable in perceivable form".

EPHEMERAL ENCRYPTION-KEY: A cryptographic key is ephemeral if it is generated for each execution of a key establishment process.

FIPS: Federal Information Processing Standard

KEY ESCROW SERVICE: An arrangement in which the keys needed to decrypt encrypted data are held in escrow by a trusted third-party so that, under certain circumstances like decrypting messages encrypted with an archived, expired or revoked key, an authorized party may gain access to those keys.

KNOWN USER: A person or legal entity that has registered with a trusted escrow agent acting as a remote authentication system or broker, and has optionally undergone an identity verification process to prove their legal identity in compliance with applicable standards such as described in NIST Special Publication 800-63A "Digital Identity Guidelines—Enrollment & Identity Proofing".

MAC: A Message Authentication Code is a bit string of fixed length, computed by a MAC generation algorithm such as Cipher-block Message Authentication Code (CMAC), that is used to establish the authenticity and, hence, the integrity of a message.

NIST: National Institute of Standards and Technology.

RELYING PARTY: An entity that relies upon the known user's token and credentials or a verifier's assertion of a known user's identity, typically to prove the known user created and/or signed a document.

REMOTE AUTHENTICATION SYSTEM (RAS): A system such as a gateway or third-party middleman operator, accessible remotely over the wide-area-network communicatively coupled with known users' computing devices that serves as the trusted escrow agent (e.g., trusted middleman) for verifying and registering the known user, the known user's unique identity token, the known user's device-unique identity token, the long-term shared-secret encryption key-derivation key, the known user's biometric digital signatures and optionally other credentials in order to use those identity factors and others to authenticate the known user to facilitate secure document processing between known users and relying parties.

SYMMETRIC DATA ENCRYPTION-KEY: Keys used with symmetric-key algorithms where identical keys are used for both encryption and decryption of data to apply confidentiality protection to information.

SYMMETRIC SIGNING-KEY: Used with symmetric-key algorithms to provide assurance of the integrity and source of messages, communication sessions, or stored data.

TRUSTED ESCROW AGENT SIGNATURE VERI-FIER: A remote authentication system such as a gateway or third-party middleman operator that acts as the transaction broker between the known user and the relying party(ies). The verifier, or remote authentication system, serves as the trusted escrow agent (e.g., trusted middleman) for the long-term shared-secret key-derivation key, device-unique identity token, known user's unique identity token, and optionally payment credential tokens in order to facilitate secure transaction processing between the parties.

VERIFIER: See TRUSTED ESCROW AGENT SIGNATURE VERIFIER.

I claim:

1. A method for a known user utilizing a computing device to electronically sign documents or other digital media utilizing a multifactor user authentication challenge-response independently verified by a remote authentication system as a symmetric signing-key performing steps comprising:

obtaining from a machine-readable data storage mechanism associated with a known user's computing device a device-unique identity token bound to the computing device, whereby cryptographic verification of the unique identity of the computing device registered by the remote authentication system as a first authentication factor is provided;

transmitting the device-unique identity token to the remote authentication system over a network communicatively coupled to the known user's computing device and using it to negotiate a session encryption key over the external interface associated with the known user's computing device, whereby confidentiality of the data transmitted is provided by establishing an encrypted network session between the known user's computing device and the remote authentication system;

obtaining from the machine-readable data storage associated with the known user's computing device a unique user identity token bound to the known user when registered with the remote authentication system;

generating a request on the computing device for authentication by the remote authentication system which includes at least the device-unique identity token and the unique known user identity token;

transmitting the request for authentication from the known user's computing device to the remote authentication system over a network communicatively coupled to the known user's computing device;

receiving an authentication-request generated by the remote authentication system containing at least a numeric one-time random challenge of arbitrary length consisting of a random sequence of digits;

displaying the numeric one-time random challenge on a trusted display associated with the known user's computing device;

obtaining from the machine-readable data storage associated with the known user's computing device the known user's biometric minutiae along with the corresponding biometric digital-signatures associated with the known user's secret password characters;

obtaining values detected by trusted sensor mechanism(s) associated with the known user's computing device to acquire biometric minutiae for each of the secret password characters entered by the known user corresponding to the digits in the numeric one-time random challenge displayed on the known user's computing device;

comparing the biometric minutiae for each secret password character entered by the known user in response to the one-time challenge to confirm it matches the biometric minutiae for the corresponding password character previously registered by the known user on the known user's computing device, whereby knowledge of the secret-password as a second authentication factor combined with biometric identification of the known user as a third authentication factor is provided;

generating a challenge-response to the numeric one-time challenge by concatenating at least the known user's biometric digital-signatures corresponding to the secret password characters entered by the known user in the order of the displayed random numerals in the challenge, whereby protection from network interception, man-in-the-middle, and replay attacks is provided as a fourth authentication factor;

performing cryptographic operations on said challenge response to generate a hashed challenge-response;

generating a known user's authentication-response to the authentication-request received from the remote authentication system that contains at least the unique known user's identity token, the hashed challenge-response and optionally the numeric one-time random challenge;

transmitting the known user's authentication-response to the remote authentication system over a network communicatively coupled to the known user's computing device;

accessing the known user registration database associated with the remote authentication system by using the known user's unique identity token to retrieve the known user's biometric digital signatures;

comparing a known user's authentication-response independently reproduced by the remote authentication system by replicating these same steps to the known user's authentication-response received from the known user's computing device to verify that they match;

transmitting the result of the comparison from the remote authentication system to the known user's computing device over a network communicatively coupled to the known user's computing device;

receiving by the known user's computing device the result of said comparison from the remote authentication system over a network communicatively coupled to the known user's computing device;

creating a hash-digest of a document on the known user's computing device using a hashing algorithm;

generating on the remote authentication system a digital signature for the document or other digital media using the known user's independently reproduced authentication-response as the cryptographic key to perform cryptographic operations on the hash-digest of the document; and delivering electronically to a computing device of a recipient the document and its digital-signature metadata including the device-unique identity token, the known user's unique identity token, the date/time stamp evidencing when the document was signed, the one-time random challenge and the digital signature of the document or other digital media, whereby cryptographic evidence proving with very-high confidence that the document or other digital media was digitally signed by the known user is provided.

2. The method of claim 1 where a plurality of signatories who are known users using a computing device to electronically sign documents utilizing a four-factor authentication-response as a symmetric signing-key verified by a remote authentication system may sign documents, whereby extended validation document signing is provided.

3. The method of claim 1, further comprising providing, by the remote authentication system, verification for the recipient of the authenticity of the signature of the known user who digitally signed the document along with validation of the document's integrity by:

receiving by the remote authentication system the document to be verified together with its digital-signature metadata including a device-unique identity token, the known user's unique identity token, the date/time stamp evidencing when the document was signed, the hash-digest of the document, the one-time random challenge and the digital signature from the recipient's computing device over a network communicatively coupled to the recipient's computing device;

reproducing independently on the remote authentication system the known user's four-factor authentication-response by using the one-time-use random challenge plus the device-unique identity token and the shared-secret biometric digital-signatures associated with the known user stored in the known user registration database associated with the remote authentication system;

reproducing on the remote authentication system the digital signature of the document using the known user's independently reproduced authentication-response as the cryptographic key to perform cryptographic operations on the hash-digest of the document;

comparing on the remote authentication system the digital signature received from the recipient's computing device with the digital signature reproduced by the remote authentication system; and transmitting the result of the comparison indicating whether the signatures match back to the recipient's computing device proving the authenticity of the signature was cryptographically confirmed, whereby very-high confidence verification that the document was signed by the known user and not someone posing as the known user, and validation the document was not tampered with is provided.

4. The method of claim 1, further comprising providing, using the recipient's computing device, non-repudiation service to the recipient to verify that it was the known user who signed the document by:

transmitting by the recipient's computing device the document to be verified together with its digital-signature metadata including the device-unique identity token, the known user's unique identity token, the date/time stamp evidencing when the document was signed, the hash-digest of the document, the one-time random challenge and the digital signature to the remote authentication system over a network communicatively coupled to the recipient's computing device;

reproducing independently on the remote authentication system the known user's four-factor authentication-response by using the one-time-use random challenge plus the device-unique identity token and shared-secret biometric digital-signatures associated with the known user stored in the known user registration database associated with the remote authentication system;

reproducing on the remote authentication system the digital signature of the document using the known user's independently reproduced authentication-response as the cryptographic key to perform cryptographic operations on the hash-digest of the document;

comparing on the remote authentication system the digital signature received from the recipient's computing device with the digital signature reproduced by the remote authentication system; and transmitting the result of the comparison indicating whether the signatures match back to the recipient's computing device to verify the authenticity of the digital signature was confirmed cryptographically to prove that it was the known user who digitally signed the document and validating that the document has not been tampered with after being signed, whereby very high confidence is provided that the known user's repudiation that they signed said document is false.

5. The method of claim 1 where the remote authentication system performs a key escrow service if the known user changes their password and/or biometric digital signatures comprising:

archiving all previous versions of the known user's biometric digital signatures along with the range of date/time-periods they were valid in the known user registration database associated with the remote authentication system, whereby key escrow services to retroactively decrypt digital signatures and other encrypted data from any time in the past that were encrypted using previously archived biometric digital signatures is provided.

6. The method of claim 1 where a plurality of known users' four-factor authentication-responses are used to generate and exchange symmetric encryption-keys to perform data encryption and decryption for confidential communications using computing devices with steps comprising;

obtaining from the machine-readable data storage associated with one or more of the computing devices the unique user identity token(s) bound to the known user and a plurality of other known users;

transmitting to a remote authentication system a request for encrypted connection(s) from a registered known user to a plurality of other registered known users from the known user's computing device over a network communicatively coupled to the computing device;

communicating between the known users' computing devices and the remote authentication system to generate each of the known users' authentication-responses;

generating the known users' session encryption-key segments on the remote authentication system by concatenating their authentication-responses with random nonces of arbitrary length and performing cryptographic operations on the results;

encrypting the other known user('s/s') encryption key segments with each known user's authentication response;

transmitting said encrypted encryption-key segments along with random nonces of arbitrary length to each known users' computing device(s);

decrypting the other known user ('s/s') encryption-key segments with the known-user's authentication-response generated on their own computing device;

combining the known user's authentication-response with the random nonce and performing cryptographic operations on the result to create the known user's encryption-key segment;

concatenating the known user's encryption-key segment with the other known users' encryption-key segments to construct the session encryption-keys on each of the known users' computing devices and optionally hashing the result; whereby secure exchange of matching symmetrical encryption-keys is provided; and using the matching symmetric encryption-key pairs to encrypt and decrypt data transmitted between the known users, whereby quantum-immune encryption for data confidentiality with perfect forward secrecy using ephemeral keys with strong encryption strength and strong authentication strength verifying that the data was encrypted by the known user and not someone posing as the known user is provided.

7. A system comprising:

at least one processor and computer readable medium storing instructions which, when executed, cause the at least one processor to perform a process including, obtaining from a machine-readable data storage mechanism associated with a known user's computing device a device-unique identity token bound to the known user's computing device, whereby cryptographic verification of the unique identity of the computing device registered by the remote authentication system as a first authentication factor is provided;

transmitting the device-unique identity token to the remote authentication system over a network communicatively coupled to the known user's computing device and using it to negotiate a session encryption key over the external interface associated with the known user's computing device, whereby confidentiality of the data transmitted is provided by establishing an encrypted network session between the known user's computing device and the remote authentication system;

obtaining from the machine-readable data storage associated with the known user's computing device a unique user identity token bound to the known user when registered with the remote authentication system;

generating a request on the computing device for authentication by the remote authentication system which includes at least the device-unique identity token and the unique known user identity token;

transmitting the request for authentication from the known user's computing device to the remote authentication system over a network communicatively coupled to the known user's computing device;

receiving an authentication-request generated by the remote authentication system containing at least a numeric one-time random challenge of arbitrary length consisting of a random sequence of digits;

displaying the numeric one-time random challenge on a trusted display associated with the known user's computing device;

obtaining from the machine-readable data storage associated with the computing device the known user's biometric minutiae along with the corresponding biometric digital-signatures associated with the known user's secret password characters;

obtaining values detected by trusted sensor mechanism(s) associated with the computing device to acquire biometric minutiae for each of the secret password characters entered by the known user corresponding to the digits in the numeric one-time random challenge displayed on the known user's computing device;

comparing the biometric minutiae for each secret password character entered by the known user in response to the one-time challenge to confirm it matches the biometric minutiae for the corresponding password character previously registered by the known user on the known user's computing device, whereby knowledge of the secret-password as a second authentication factor combined with biometric identification of the known user as a third authentication factor is provided;

generating a challenge-response to the numeric one-time challenge by concatenating at least the known user's biometric digital-signatures corresponding to the secret password characters entered by the known user in the order of the displayed random numerals in the challenge, whereby protection from network interception, man-in-the-middle, and replay attacks is provided as a fourth authentication factor;

performing cryptographic operations on said challenge response to generate a hashed challenge-response;

generating a known user's authentication-response to the authentication-request received from the remote authentication system that contains at least the unique known user's identity token, the hashed challenge-response and optionally the numeric one-time random challenge;

transmitting the known user's authentication-response to the remote authentication system over a network communicatively coupled to the known user's computing device;

accessing the known user registration database associated with the remote authentication system by using the known user's unique identity token to retrieve the known user's biometric digital signatures;

comparing a known user's authentication-response independently reproduced by the remote authentication system by replicating these same steps to the known user's authentication-response received from the known user's computing device to verify that they match;

transmitting the result of the comparison from the remote authentication system to the known user's computing device over a network communicatively coupled to the known user's computing device;

receiving by the known user's computing device the result of said comparison from the remote authentication system over a network communicatively coupled to the known user's computing device, creating a hash-digest of a document on the known user's computing device using a hashing algorithm;

generating on the remote authentication system a digital signature for the document or other digital media using the known user's independently reproduced authentication-response as the cryptographic key to perform cryptographic operations on the hash-digest of the document; and delivering electronically to a computing device of a recipient the document and its digital-signature metadata including the device unique identity token, the known user's unique identity token, the date/time stamp evidencing when the document was signed, the one time random challenge and the digital signature of the document or other digital media, whereby cryptographic evidence proving with very high confidence that the document or other digital media was digitally signed by the known user is provided.

8. The system according to claim 7, wherein a plurality of signatories who are known users using a computing device to electronically sign documents utilizing a four-factor authentication-response as a symmetric signing-key verified by the remote authentication system may sign documents, whereby extended validation document signing is provided.

9. The system of claim 7, wherein the process further comprises providing, by the remote authentication system, verification for the recipient of the authenticity of the signature of the known user who digitally signed the document along with validation of the document's integrity by:

receiving by the remote authentication system the document to be verified together with its digital-signature metadata including a device-unique identity token, the known user's unique identity token, the date/time stamp evidencing when the document was signed, the hash-digest of the document, the one-time random challenge and the digital signature from the recipient's computing device over a network communicatively coupled to the recipient's computing device;

reproducing independently on the remote authentication system the known user's four-factor authentication-response by using the one-time-use random challenge plus the device-unique identity token and the shared-secret biometric digital-signatures associated with the known user stored in the known user registration database associated with the remote authentication system;

reproducing on the remote authentication system the digital signature of the document using the known user's independently reproduced authentication-response as the cryptographic key to perform cryptographic operations on the hash-digest of the document;

comparing on the remote authentication system the digital signature received from the recipient's computing device with the digital signature reproduced by the remote authentication system; and transmitting the result of the comparison indicating whether the signatures match back to the recipient's computing device proving the authenticity of the signature was cryptographically confirmed, whereby very-high confidence verification that the document was signed by the known user and not someone posing as the known user, and validation the document was not tampered with is provided.

10. The system of claim 7, wherein the process further comprises providing, using the recipient's computing device, non-repudiation service to the recipient to verify that it was the known user who signed the document by:

transmitting by the recipient's computing device the document to be verified together with its digital-signature metadata including the device-unique identity token, the known user's unique identity token, the date/time stamp evidencing when the document was signed, the hash-digest of the document, the one-time random challenge and the digital signature to the remote authentication system over a network communicatively coupled to the recipient's computing device;

reproducing independently on the remote authentication system the known user's four-factor authentication-response by using the one-time-use random challenge plus the device-unique identity token and shared-secret biometric digital-signatures associated with the known user stored in the known user registration database associated with the remote authentication system;

reproducing on the remote authentication system the digital signature of the document using the known user's independently reproduced authentication-response as the cryptographic key to perform cryptographic operations on the hash-digest of the document;

comparing on the remote authentication system the digital signature received from the recipient's computing device with the digital signature reproduced by the remote authentication system; and transmitting the result of the comparison indicating whether the signatures match back to the recipient's computing device to verify the authenticity of the digital signature was confirmed cryptographically to prove that it was the known user who digitally signed the document and validating that the document has not been tampered with after being signed, whereby very high confidence is provided that the known user's repudiation that they signed said document is false.

11. The system according to claim 7, wherein a remote authentication system performs a key escrow service if the known user changes their password and/or biometric digital signatures comprising:

archiving all previous versions of the known user's biometric digital signatures along with the range of date/time-periods they were valid in the known user registration database associated with the remote authentication system, whereby key escrow services to retroactively decrypt digital signatures and other encrypted data from any time in the past that were encrypted using previously archived biometric digital signatures is provided.

12. The system according to claim 7, wherein a plurality of known users' four factor authentication responses are used to generate and exchange symmetric encryption keys to perform data encryption and decryption for confidential communications using computing devices with steps comprising:

obtaining from the machine-readable data storage associated with one or more of the computing devices the unique user identity token(s) bound to the known user and a plurality of other known users;

transmitting to a remote authentication system a request for encrypted connection(s) from a registered known user to a plurality of other registered known users from the known user's computing device over a network communicatively coupled to the computing device;

communicating between the known users' computing devices and the remote authentication system to generate each of the known users' authentication responses;

generating the known users' session encryption key segments on the remote authentication system by concatenating their authentication responses with random nonces of arbitrary length and performing cryptographic operations on the results;

encrypting the other known user('s/s') encryption key segments with each known user's authentication response;

transmitting said encrypted encryption-key segments along with random nonces of arbitrary length to each known users' computing device(s);

decrypting the other known user('s/s') encryption key segments with the known-user's authentication response generated on their own computing device;

combining the known user's authentication response with the random nonce and performing cryptographic operations on the result to create the known user's encryption key segment;

concatenating the known user's encryption key segment with the other known users' encryption key segments to construct the session encryption keys on each of the known users' computing devices and optionally hashing the result; whereby secure exchange of matching symmetrical encryption keys is provided; and using the matching symmetric encryption-key pairs to encrypt and decrypt data transmitted between the known users, whereby quantum-immune encryption for data confidentiality with perfect forward secrecy using ephemeral keys with strong encryption strength and strong authentication strength verifying that the data was encrypted by the known user and not someone posing as the known user is provided.

* * * * *